(12) United States Patent
Koganty et al.

(10) Patent No.: US 10,203,972 B2
(45) Date of Patent: Feb. 12, 2019

(54) FRAMEWORK FOR NETWORKING AND SECURITY SERVICES IN VIRTUAL NETWORKS

(71) Applicant: VMware, Inc., Palo Alto, CA (US)

(72) Inventors: Raju Koganty, San Jose, CA (US); Alex Nhu, San Jose, CA (US); Chi-Hsiang Su, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 77 days.

(21) Appl. No.: 13/833,095

(22) Filed: Mar. 15, 2013

(65) Prior Publication Data
US 2014/0059544 A1 Feb. 27, 2014

Related U.S. Application Data

(60) Provisional application No. 61/693,630, filed on Aug. 27, 2012.

(51) Int. Cl.
*G06F 9/455* (2018.01)
*G06F 9/50* (2006.01)

(52) U.S. Cl.
CPC ...... *G06F 9/45533* (2013.01); *G06F 9/45558* (2013.01); *G06F 9/5077* (2013.01); *G06F 2009/45595* (2013.01)

(58) Field of Classification Search
CPC ............. G06F 9/45533; G06F 9/45558; G06F 2009/45595
USPC ............................................................ 718/1
See application file for complete search history.

(56) References Cited

U.S. PATENT DOCUMENTS

| | | | |
|---|---|---|---|
| 6,243,451 B1* | 6/2001 | Shah | H04M 3/42136 370/352 |
| 8,195,774 B2 | 6/2012 | Lambeth et al. | |
| 9,590,820 B1* | 3/2017 | Shukla | H04L 12/4633 |
| 2007/0150597 A1 | 6/2007 | Hasan et al. | |
| 2008/0155223 A1 | 6/2008 | Hiltgen et al. | |
| 2010/0027420 A1 | 2/2010 | Smith | |
| 2010/0054129 A1 | 3/2010 | Kuik et al. | |

(Continued)

FOREIGN PATENT DOCUMENTS

JP   2012-084129 A   4/2012

OTHER PUBLICATIONS

International Patent Application No. PCT/US2013/043446 filed May 30, 2013, Notification of Transmittal of the International Search Report and the Written Opinion of the International Searching Authority, or the Declaration, International Search Report dated Sep. 4, 2013, Written Opinion of the International Searching Authority, 14 pages.

(Continued)

*Primary Examiner* — Nicholas R Taylor
*Assistant Examiner* — Tania M Pena-Santana

(57) ABSTRACT

Methods, computer-readable storage medium, and systems described herein facilitate registering and consuming network services on a virtual network. A virtual machine management server (VMMS) is configured to receive a service definition associated with a network service. The VMMS creates one or more service profiles based on the service definition. The VMMS configures a plurality of hosts based on the one or more service profiles such that the network service is usable, via a virtual network, by one or more virtual machines within the plurality of hosts.

17 Claims, 2 Drawing Sheets

(56) References Cited

U.S. PATENT DOCUMENTS

| | | | |
|---|---|---|---|
| 2010/0169467 A1 | 7/2010 | Shukla et al. | |
| 2010/0188990 A1* | 7/2010 | Raleigh | G06Q 10/06375 370/252 |
| 2010/0214949 A1* | 8/2010 | Smith | H04L 45/586 370/254 |
| 2011/0022694 A1 | 1/2011 | Dalal et al. | |
| 2012/0102291 A1 | 4/2012 | Cherian et al. | |
| 2012/0123829 A1 | 5/2012 | Chen et al. | |
| 2013/0163606 A1* | 6/2013 | Bagepalli | H04L 49/356 370/409 |
| 2013/0262396 A1* | 10/2013 | Kripalani | G06F 17/30289 707/674 |
| 2013/0290694 A1* | 10/2013 | Civilini | H04L 41/0806 713/2 |
| 2013/0301473 A1* | 11/2013 | Huang | H04L 41/046 370/254 |
| 2014/0122724 A1* | 5/2014 | Zhang et al. | 709/226 |

OTHER PUBLICATIONS

Japanese Office Action dated Mar. 15, 2016 for Application No. 2015-529796.

Ohno et al., Cloud Data Center of the Service Level Management Operational Model-Based Management Mechanism for the Automation of Electronics, Information and Communication Engineers Technical report CPSY2011-22, book, Institute of Electronics, Information and Communication Engineers, Jul. 21, 2011, vol. 111, No. 163, pp. 79-84.

Liao, Chun-Hao, et al.,A novel mechanism for rapid provisioning virtual machines of cloud services,Network Operations and Management Symposium (NOMS),IEEE,Apr. 2012,pp. 721-735.

Understanding Cisco Unified Computing System Service Profiles, white_paper_c11-590518.pdf, Cisco, 2010.

Euopean International Search Report dated Mar. 31, 2016 for Application No. 13832887.7.

Chinese First Office Action and Search Report issued by the State Intellectual Property Office dated Mar. 29, 2017; Chinese Application No. 2013800536027, 6 pages.

* cited by examiner

FRAMEWORK FOR NETWORKING AND SECURITY SERVICES IN VIRTUAL NETWORKS

CROSS REFERENCE TO RELATED APPLICATION

This application claims priority to U.S. provisional application No. 61/693,630 filed Aug. 27, 2012, which is incorporated herein in its entirety.

BACKGROUND

Virtual machines, which are an abstraction of physical computing resources, may communicate with other virtual machines using a network. The network may be a virtual network, which is an abstraction, or virtualization, of a physical network. Virtual networks may operate as layer two in the OSI model between and among virtual machines. Unlike physical networks, virtual networks are not constrained by physical links and topology. Thus, virtual machines within a virtual network may move from one physical computer to another without affecting communication within the virtual network. One such virtual network is a Virtual Extensible LAN (VXLAN), as described in the white paper titled "Scalable Cloud Networking with Cisco *Nexus* 1000V Series Switches and VXLAN", which is filed herewith and is incorporated by reference in its entirety. As described therein: VXLAN provides a MAC in User Datagram Protocol (MAC-in-UDP) encapsulation technique and a 24-bit segment identifier in the form of a VXLAN ID. The UDP encapsulation allows each LAN segment to be extended across Layer 3. Therefore, virtual networks can be extended among machines placed in different Layer 2 domains. For VXLAN traffic to use network services on physical devices, such as a physical firewall, the traffic needs to go through a VXLAN gateway.

Many networking and security services are offered for physical networks, such as load balancers, firewalls, virus scanners, etc. Some services operate within a network, while others operate as a gateway or outside of a network. Such services may be unable to communicate with virtual networks, and virtual networks may be unaware that such services exist on a network. Some services are able to communicate with virtual networks, however, there is currently no method for uniformly introducing and consuming such services within virtual networks. Accordingly, there is a need for a uniform method of introducing and consuming network services for use with virtual networks.

SUMMARY

Methods, computer-readable storage medium, and systems described herein facilitate registering and consuming network services on a virtual network. A virtual machine management server (VMMS) is configured to receive a service definition associated with a network service. The VMMS creates one or more service profiles based on the service definition. The VMMS configures a plurality of hosts based on the one or more service profiles such that the network service is usable, via a virtual network, by one or more virtual machines within the plurality of hosts.

DETAILED DESCRIPTION

Figure 1:
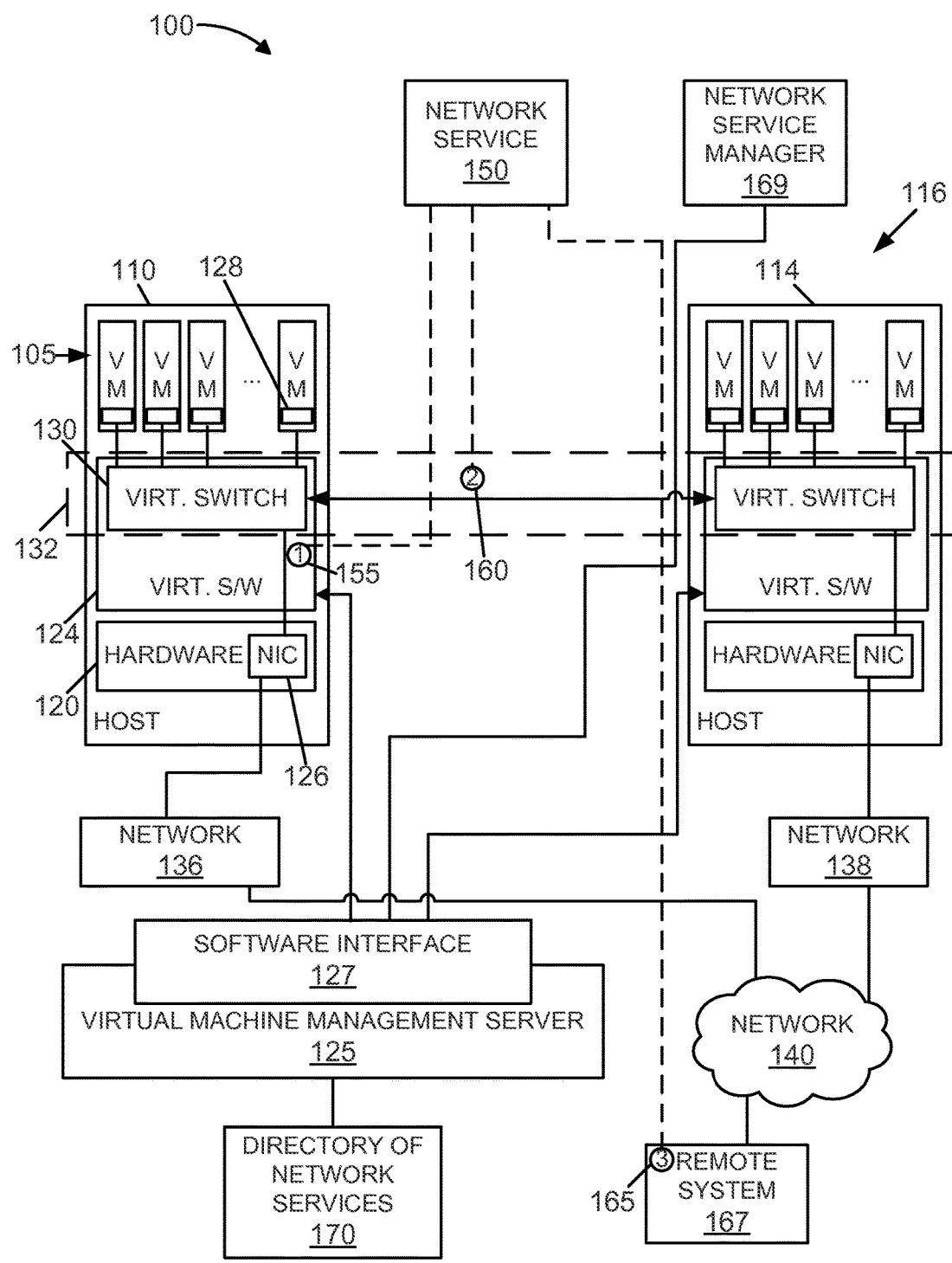
FIG. 1 is a block diagram of an exemplary virtual infrastructure having a virtual network.

FIG. 1 is an exemplary virtual infrastructure 100 having distributed virtual networking and a plurality of virtual machines (VMs) 105 on physical computer systems, or hosts, 110 and 114, collectively known as a cluster 116. Virtual infrastructure 100 may be a cloud-based architecture, wherein multiple users of virtual infrastructure 100 are able to instantiate and manage VMs 105. Thus, virtual infrastructure 100 may be a multi-tenant environment with tenants, or users, that have varying needs and purposes.

Each VM 105 provides a virtual environment wherein a guest operating system (not shown) may reside and operate. Each physical computer 110 and 114, includes hardware 120, a virtualization software or manager 124 running on hardware 120, and one or more VMs 105 executing on hardware 120 by way of virtualization software 124. Virtualization software 124 is therefore logically interposed between, and interfaces with, hardware 120 and VMs 105. Virtualization software 124 may be implemented wholly or in part in hardware, e.g., as a system-on-a-chip, firmware, FPGA, etc. The hardware 120 includes at least one processor (not shown), wherein each processor is an execution unit, or "core," on a microprocessor chip. The hardware 120 also includes a system memory (not shown), which is a general volatile random access memory (RAM), a network interface port (NIC) 126, a storage system (not shown), and other devices. The NIC 126, sometimes referred to as a physical NIC, may be an Ethernet network interface or similar interface.

Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each VM 105. In the exemplary embodiment, each VM 105 is an abstraction of a physical computer system and may include an operating system (OS), such as Microsoft Windows® and applications, which are referred to as the "guest OS" and "guest applications," respectively, wherein the term "guest" indicates it is a software entity that resides within the VM. Microsoft Windows® is a registered trademark of the Microsoft Corporation of Redmond, Wash.

A Virtual Machine Management Server (VMMS) 125 provides a software interface 127 that, among other things, allows users and other programs to control the lifecycle of VMs 105 running on physical computers 110 and 114, that are managed by VMMS 125. VMMS 125 may provide other VM management and manipulations than those specifically mentioned here.

Each VM 105 may include one or more virtual NICs 128 that are coupled to a virtual switch 130. Virtualization software 124 provides and manages virtual switch 130, and virtualization software 124 may provide more than one virtual switch. Each virtual switch 130 in hosts 110 and 114 may be logically grouped together to form a virtual network 132. Virtual network 132 is an abstraction of a physical network and may provide a virtual layer two, or a data link layer, including services such as encapsulation of network layer data packets into frames, frame synchronization, and media access control, among other things. Virtual network 132 may span one or more physical networks and may be organized independent of the underlying physical topology and organization of the physical networks. In the exemplary embodiment, virtual network 132 spans a first network 136 that includes host 110 and a second network 138 that includes host 114. First and second networks 136 and 138 may be different subnets on the same physical network, connected via routers, VPN, and/or switches (not shown), or, in the exemplary embodiment, may be networked via network 140, which may include the Internet. Virtual switches 130 and virtual network 132 may be managed by VMMS 125.

A network service 150, such as a load balancer, proxy, firewall, virus scanner, or any other service that may run on a physical network, may be integrated with virtual network 132. Network service 150 may be implemented in software and/or hardware. As described in more detail herein, a platform is provided for offering network service 150 to virtual network 132 and components thereof, such as VMs 105. Installation, or insertion, points are provided as interfaces between virtual network 132 and network service 150. Network services, such as network service 150, may be installed at one or more insertion points. In the exemplary embodiment, three insertion points are provided as examples.

A first insertion point 155 may exist in virtual switch 130. Some network services require the inspection or manipulation of packets, such as header alteration, forwarding, encapsulation, etc. Accordingly, network service 150 may install one or more rules or filters, in virtual switch 130 in order to enable network service 150. Rules may be similar to ipchains- or iptables-type rules. In one example, network service 150 implements firewall rules and installs, on virtual switch 130, one or more rules that block incoming traffic on pre-determined ports. Moreover, network service 150 may be installed within, or in communication with, virtual software 124 and still be considered to be within first insertion point 155. For example, network service 150 may include code that runs as a module within virtual software 124. Thus, network service 150 may be installed within each host using first insertion point 155.

In another example, additional processing may be required to enable network service 150. For example, network service 150 may install rules in virtual switch 130 that forward some or all traffic to an endpoint for further analysis. The endpoint may be a physical network device, software running in a guest OS on one or more VMs 105, and/or a virtual appliance (not shown) running on one or more VMs 105. A virtual appliance is a specialized virtual machine for performing a specific task or tasks. A virtual appliance may include a pre-configured operating system and a single application, which are packaged together in a virtual machine image, such as a Open Virtualization Format (OVF) file.

A second insertion point 160 may exist within virtual network 132. Network service 150 may be an edge service, such as a load balancer, that operates with and within virtual network 132. Network service 150 may be implemented anywhere that virtual network 132 reaches, including physical devices networked with networks 136 and 138, or as a VM. Network service 150, when inserted into virtual network 132, must understand virtual networking. In particular, network service 150 should know how to communicate using virtual network 132 with VMs 105 and other members of virtual network 132.

A third insertion point 165 exists external to virtual network 132 and physical networks 136 and 138 on a remote system 167 and, in the exemplary embodiment, is accessible via network 140. For example, third insertion point 165 may be a web- or cloud-based service available on the Internet. In order to access network service 150 on remote system 167, data from VMs 105 may be encapsulated for transport in layer three to remote system 167. Alternatively, packets from VMs 105 or virtual network 132 may be forwarded to remote system 167.

For example, network service 150, available on remote system 167, may be a web security service that filters web traffic for malicious data and blocked uniform resource locators (URLs). Web requests from virtual network 132 and/or VMs 105 may be redirected to remote system 167 for processing by network service 150. Network service 150 may fetch the requested web resources, perform filtering, and then return the filtered data to the requester on virtual network 132.

In some embodiments, network service 150 may be managed from a network service manager 169, which is coupled to a directory of network services 170 via software interface 127. Network service manager 169 may communicate with network service 150 via virtual network 132 and/or physical networks 136 and 138. Network service manager 169 provides an administrative interface for managing network service 150. For example, network service manager 169 may provide a web interface for configuring a load balancer provided by network service 150. In the exemplary embodiment, network service manager 169 is illustrated as being a separate component from VMMS 125 and communicates with VMMS 125 to function as described herein. However, in some embodiments, network service manager 169 may be incorporated within VMMS 125 to enable VMMS 125 to function as described herein.

While some insertion points and network services have been provided as examples, it is contemplated that many more insertion points are available and that other network services may be provided. For example, an insertion point may exist on a physical network routable from virtual network 132, but that is different than networks 136, 138, and 140. Network services may also include domain name system (DNS) for virtual networks, dynamic host configuration protocol (DHCP), network file system (NFS), simple network management protocol (SNMP), directory and authentication services, etc.

In one embodiment, network service manager 169 communicates with VMMS 125 such that VMMS 125 is configured to create and make available a directory of network services 170. The directory of network services 170 may be implemented as a database or other datastore, such as a flat file, and may be internal or external to VMMS 125. Initially, VMMS 125 receives a service definition from network service 125. The service definition includes information about network service 150 to be included in the directory of network services 170, such as a service name and a service description. The service definition also includes configuration instructions and/or data for configuring hosts 110 and 114 for use with network service 150. VMMS 125 is configured, as explained in more detail herein, to configure hosts 110 and 114 and virtual network 132 to be able to use network service 150. VMMS 125 enables VMs 105 to use network service 150, possibly at the discretion of the administrator of each VM 105.

In one embodiment, VMMS 125 creates one or more service profiles based on the service definition. An administrator of VMMS 125 may cause service profiles to be created. Service profiles are used to describe the services available from network service 150 on virtual network 132 and/or in cluster 116. Thus, the administrator of VMMS 125 may customize network service 150. The administrator of VMMS 125 may also, using VMMS 125, selectively make service profiles available to virtual networks, hosts, clusters, VMS, collections of VMs, e.g., pools of VMs and/or user groups. Whether a service profile is available to one of the VMs 105 is indicated in the directory of network services 170. A network service is "registered" before a service profile based on the network service is added to the directory of network services 170.

To enable the service profiles and network service 150 on virtual network 132, VMMS 125 configures hosts 110 and 114 using the configuration instructions in the service definition. Configuring hosts 110 and 114 may include configuring virtual software 124 and/or virtual switch 130 such that network service 150 is reachable and usable. For example, virtual switch 130, or ports of virtual switch 130, may be configured with rules and/or filters that forward packets from VM 105 to network service 150. Network service 150 is not usable by VM 105 until enabled by VMMS 125, and hosts may be configured to use network service 150 if the host is within virtual network 132.

To consume network service 150, an administrator of VM 105, i.e., a cloud user, uses VMMS 125 to browse the directory of network services 170 for available network services, i.e., service profiles. The administrator selects an available service profile, e.g., for network service 150, and causes VMMS 125 to enable the network service. Network service 150 is enabled by VMMS 125 for the selected VM 105 by sending an enablement command to virtual software 124.

Figure 2:
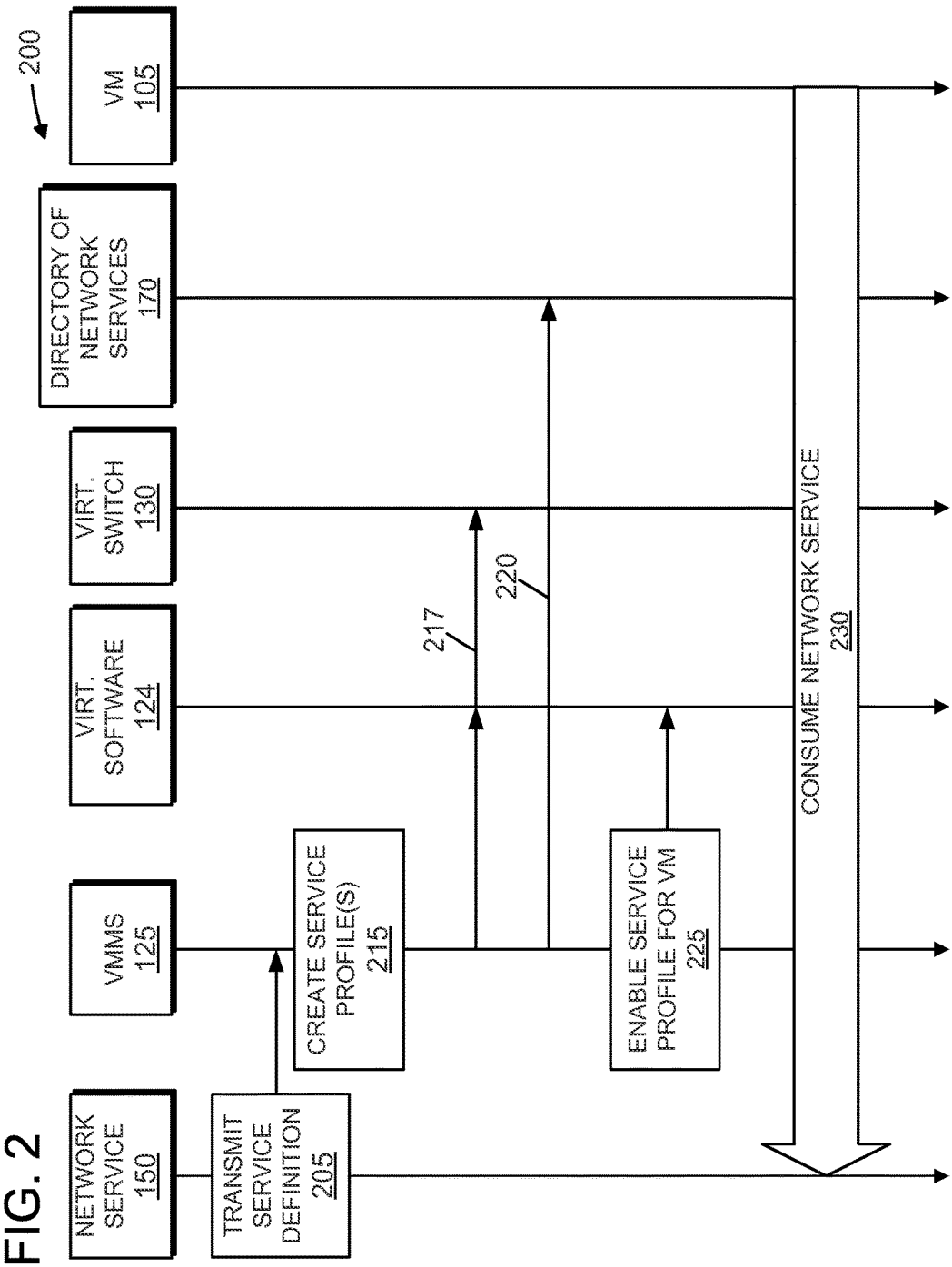
FIG. 2 is a swimlane diagram of an exemplary method for registering and consuming network services using the virtual infrastructure in FIG. 1.

FIG. 2 is a swimlane diagram of an exemplary method 200 for registering and consuming a network service, such as network service 150, for use with a virtual network, such as virtual network 132 (shown in FIG. 1). Network service 150 is registered and made available, such that VMs 105, virtual switches 130, and virtual network 132 are able to utilize network service 150. Initially, network service 150 transmits a service definition 205 to VMMS 125 via, for example, network service manager 169. Network service 150 may refer to the vender that provides network service 150, in which case, the vendor transmits service definition 205 to VMMS 125. The service definition may be received by VMMS 125 using APIs, web service calls, file uploads, etc., and may be embodied in a file, a string, a series of procedure calls, etc. The service definition may include, but is not limited to, a vendor name, a service name, a service description, administrator contact information, one or more service endpoints such as URLs, IP addresses, etc., and/or one or more service levels. More specifically, in the exemplary embodiment, the service definition contains information necessary for network service 150 to be used by VMs 105, virtual switches 130, and/or virtual network 132. In the exemplary embodiment, network service 150 is not operable before the service definition is transmitted 205. The service definition may include service levels that may correspond to different products, types of service, number of users, or other varying service levels. The service definition includes configuration instructions and/or data for use in configuring VMs 105, virtual switches 130, and/or virtual network 132. For example, configuration instructions may include rules and/or filters for configuring virtual switches 130. In the case of the first insertion point 155, the configuration instructions may include a module to be executed within virtual software 124.

In the exemplary embodiment, an administrator of VMMS 125 creates, using the service definition, one or more service profiles 215. The service profile includes a configuration or parameters of the service for use on VMs 105 administered by VMMS 125. The administrator of VMMS 125 can select which network services will be made available through the service profiles. The selected service definitions can be further configured in service profiles, e.g., to select some or all service levels. More specifically, the service profiles enable the administrator of VMMS 125 to allow/disallow network services and configure network services.

The administrator of VMMS 125 makes network service 150 available to virtualization software 124 during operation 217, which includes configuring virtualization software 124 and/or virtual switch 130 with the service profile or profiles. Because network service 150 may exist in one or more insertion points 155, 160, 165 (shown in FIG. 1), virtualization software 124 and/or virtual switch 130 are configured to interact with network service at the insertion points. In operation 220, the service profiles are added to the directory of network services 170.

Service profiles are enabled 225 by VMMS 125 for one or more VMs 105 by sending an enablement command to virtual software 124. Virtual software 124 enables the service profile by directing traffic, using virtual switch 130, to and/or from the one or more insertion points 155, 160, 165 used by network service 150. Finally, network service 150 is consumed 230 by one or more VMs 105.

As described above, method 200 illustrates VMMS 125 receiving the service definition associated with network service 150 and VMMS 125 creating one or more service profiles based on the service definition. Method 200 also illustrates VMMS 125 configuring a plurality of hosts based on the service profiles such that network service 150 is usable, via a virtual network, by one or more VMs 105 within the plurality of hosts. In one embodiment, network service manager 169 may communicate with VMMS 125 to enable VMMS 125 to perform the functions of VMMS 125 as described in method 200. Alternatively, network service manager 169 may perform the functions of VMMS 125 as described in method 200 directly.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A virtual infrastructure comprising:
a plurality of hosts each including virtual switches at least one virtual machine executing therein, the virtual switches implementing a virtual network that can extend across multiple layer-2 domains on a physical network by causing encapsulation of layer-2 packets associated with the virtual network within a UDP encapsulation header; and
a management server configured to:
receive a service definition associated with a network service, the network service performing operations of at least one of a load balancer, proxy, firewall, or virus scanner, the service definition including information about the network service and configuration instructions for configuring the plurality of hosts to enable the virtual machines connected to the virtual network to use the network service;
create at least a service profile customizing the network service based on the service definition including the information about the network service and the configuration instructions, the service profile describing services available from the network service, the service profile including a particular configuration of parameters of the network service;
register the network service by adding the service profile to a directory of network services, the directory indicating whether the service profile is available to the virtual machines; and
in response to receiving a selection of the service profile from the directory and an identity of one of the virtual machines, enable the network service for the one of the virtual machines by configuring, based on the service definition, the host on which the one of the virtual machines executes such that the network service with the particular configuration of parameters is usable, wherein the configuring of the host includes configuring the virtual switch or ports thereof in the host with rules and/or filters to forward packets from the one of the virtual machines to one or more insertion points at which the network service's software is installed to run.

2. The virtual infrastructure of claim 1, wherein the management server is further configured to receive the service definition from the network service.

3. The virtual infrastructure of claim 2, wherein the service definition includes service instructions for configuring the host.

4. The virtual infrastructure of claim 3, wherein the service definition includes a reference to an insertion point, and wherein the insertion point is a virtual switch of each of the plurality of hosts.

5. The virtual infrastructure of claim 3, wherein the insertion point referenced by the service definition is on the virtual network to which the virtual machines are connected.

6. The virtual infrastructure of claim 3, wherein the insertion point referenced by the service definition is external to the virtual network to which the virtual machines are connected.

7. The virtual infrastructure of claim 1, wherein the service definition includes one or more service levels.

8. At least one computer-readable storage medium having computer-executable instructions embodied thereon, wherein, when executed by at least one processor, the computer-executable instructions cause the at least one processor to:
receive a service definition associated with a network service, the network service performing operations of at least one of a load balancer, proxy, firewall, or virus scanner, the service definition including information about the network service and configuration instructions for configuring the plurality of hosts, each including at least a virtual machine executing therein and a virtual switch, which implements a virtual network by causing layer 2 packets to be encapsulated within a UDP encapsulation header so that the virtual network can extend across multiple layer 2 domains on a physical network, the service definition and configuration instructions for enabling the virtual machines connected to the virtual network to use the network service;

create at least a service profile customizing the network service based on the service definition including the information about the network service and the configuration instructions, the service profile describing services available from the network service, the service profile including a particular configuration of parameters of the network service for use on a virtual machine of the virtual machines;

register the network service by adding the service profile to a directory of network services, the directory indicating whether the service profile is available to the virtual machines; and in response to receiving a selection of the service profile from the directory and an identity of one of the virtual machines, enable the network service for the one of the virtual machines by configuring, based on the service definition, the host on which the one of the virtual machines executes such that the network service is usable, wherein the configuring of the host includes configuring the virtual switch or ports thereof in the host with rules and/or filters to forward packets from the one of the virtual machines to one or more insertion points at which the network service software is installed to run.

9. The at least one computer-readable storage medium of claim 8, wherein the service profile is selected by a user browsing the directory of network services.

10. The at least one computer-readable storage medium of claim 8, wherein the service definition includes a reference to an insertion point.

11. The at least one computer-readable storage medium of claim 10, wherein the insertion point referenced by the service definition is the virtual switch of each of the plurality of hosts.

12. The at least one computer-readable storage medium of claim 10, wherein the insertion point referenced by the service definition is on the virtual network to which the virtual machines are connected.

13. The at least one computer-readable storage medium of claim 10, wherein the insertion point referenced by the service definition is external to the virtual network to which the virtual machines are connected.

14. A method of registering a network service on a virtual network, the virtual network implemented by causing encapsulation of layer-2 packets that are associated with the virtual network within a UDP encapsulation header so that the virtual network can extend across multiple layer-2 domains on a physical network, the method comprising:

receiving a service definition associated with a network service, the network service performing operations of at least one of a load balancer, proxy, firewall, or virus scanner, the service definition including information about the network service and configuration instructions for configuring a plurality of hosts, each including at least a virtual machine executing therein and a virtual switch, to enable the virtual machines connected to the virtual network to use the network service;

create at least a service profile customizing the network service based on the service definition including the information about the network service and the configuration instructions, the service profile describing services available from the network service, the network services comprising one or more of the following: the load balancer, the proxy, the firewall, and the virus scanner, the service profile including a particular configuration of parameters of the network service for use on a virtual machine of the plurality of virtual machines;

register the network service by adding the service profile to a directory of network services, the directory indicating whether the service profile is available to the virtual machines; and in response to receiving a selection of the service profile from the directory and an identity of one of the virtual machines, enabling the network service for the one of the virtual machines by configuring, based on the service definition, the host on which the one of the virtual machines executes such that the network service with the particular configuration of parameters is usable, wherein the configuring of the host includes configuring the virtual switch or ports thereof in the host with rules and/or filters to forward packets from the one of the virtual machines to one or more insertion points at which the network service's software is installed to run.

15. The method of claim 14, wherein the service profile is selected by a user browsing the directory of network services.

16. The method of claim 14, wherein receiving a service definition comprises receiving a service definition that includes a reference to an insertion point.

17. The method of claim 14, further comprising sending an enablement command to at least one of the plurality of hosts.

* * * * *